United States Patent
Shinohara et al.

(10) Patent No.: US 11,982,823 B2
(45) Date of Patent: May 14, 2024

(54) LIGHT GUIDE PLATE DEVICE INCLUDING OPTICAL PATH CHANGER

(71) Applicant: OMRON Corporation, Kyoto (JP)

(72) Inventors: Masayuki Shinohara, Kyoto (JP); Yasuhiro Tanoue, Kyoto (JP); Masafumi Danno, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/671,655

(22) Filed: Feb. 15, 2022

(65) Prior Publication Data
US 2022/0291440 A1 Sep. 15, 2022

(30) Foreign Application Priority Data
Mar. 15, 2021 (JP) ................................. 2021-040943

(51) Int. Cl.
| | |
|---|---|
| *G02B 30/60* | (2020.01) |
| *F21V 8/00* | (2006.01) |
| *G02B 30/56* | (2020.01) |
| *H04N 13/254* | (2018.01) |

(52) U.S. Cl.
CPC .......... *G02B 30/60* (2020.01); *G02B 6/0055* (2013.01); *G02B 30/56* (2020.01); *H04N 13/254* (2018.05)

(58) Field of Classification Search
CPC ...... G02B 5/045; G02B 6/0036; G02B 30/33; G02B 30/35; G02B 30/36; G02B 30/56; G02B 30/60; G02B 27/18; H04N 13/32
See application file for complete search history.

(56) References Cited

U.S. PATENT DOCUMENTS

| | | |
|---|---|---|
| 2011/0304615 A1 | 12/2011 | Ito et al. |
| 2011/0304700 A1 | 12/2011 | Ito et al. |
| 2011/0304710 A1 | 12/2011 | Ito et al. |
| 2011/0304711 A1 | 12/2011 | Ito et al. |
| 2013/0182457 A1 | 7/2013 | McCollum |
| 2017/0192244 A1 | 7/2017 | Shinohara et al. |

(Continued)

FOREIGN PATENT DOCUMENTS

| | | |
|---|---|---|
| CN | 102274632 A | 12/2011 |
| CN | 107111977 A | 8/2017 |

(Continued)

OTHER PUBLICATIONS

English Machine Translation of Chinese Office Action for counterpart application (Year: 2024).*

(Continued)

*Primary Examiner* — Keith G. Delahoussaye
(74) *Attorney, Agent, or Firm* — METROLEX IP LAW GROUP, PLLC (57) ABSTRACT

A light guide plate according to one or more embodiments may include an incident surface that receives light and an optical path changer on a back surface perpendicular to the incident surface. Light reflected by the optical path changer forms a stereoscopic image including a near formed image at an imaging position within a predetermined distance from the back surface and a distant formed image at another imaging position. The near formed image includes an image formation area with a larger total area than an image formation area of the distant formed image.

20 Claims, 9 Drawing Sheets

(56) References Cited

U.S. PATENT DOCUMENTS

| | | |
|---|---|---|
| 2017/0371088 A1 | 12/2017 | Kitamura et al. |
| 2018/0067248 A1 | 3/2018 | Shinohara et al. |
| 2019/0137772 A1* | 5/2019 | Takagi ................. G02B 6/0035 |
| 2019/0179161 A1 | 6/2019 | Shinohara et al. |
| 2019/0235263 A1 | 8/2019 | Shinohara et al. |
| 2019/0377193 A1* | 12/2019 | Shinohara .............. G02B 30/27 |
| 2021/0215949 A1 | 7/2021 | Shinohara et al. |
| 2021/0263612 A1 | 8/2021 | Shinohara et al. |
| 2021/0337180 A1 | 10/2021 | Hirose et al. |
| 2022/0291440 A1 | 9/2022 | Shinohara et al. |
| 2023/0205369 A1 | 6/2023 | Shinohara et al. |

FOREIGN PATENT DOCUMENTS

| | | |
|---|---|---|
| CN | 109804298 A | 5/2019 |
| CN | 208833940 U | 5/2019 |
| CN | 112262451 A | 1/2021 |
| DE | 202017106281 U1 | 2/2019 |
| JP | 2010-011055 A | 1/2010 |
| JP | 2016-018194 A | 2/2016 |
| JP | 2016-114929 A | 6/2016 |
| JP | 2016-130835 A | 7/2016 |
| JP | 2017-032663 A | 2/2017 |
| JP | 2017-032665 A | 2/2017 |
| JP | 2018-010223 A | 1/2018 |
| JP | 2018-022067 A | 2/2018 |
| JP | 2018-151556 A | 9/2018 |
| JP | 2018-151557 A | 9/2018 |
| JP | 2020-144281 A | 9/2020 |
| JP | 2022-140896 A | 9/2022 |
| JP | 2023-80077 A | 6/2023 |

OTHER PUBLICATIONS

Office Action (JPOA) dated Nov. 7, 2023 in a counterpart Japanese patent application No. 2021-040943, with English translation.

Office Action (JPOA) dated Nov. 7, 2023 in a counterpart Japanese patent application No. 2023-039689, with English translation.

Office Action (JPOA) issued on Nov. 28, 2023 in a counterpart Japanese patent application, with English translation.

Chinese Office Action issued on Feb. 20, 2024 in a counterpart Chinese patent application.

Japanese Office Action (JPOA) mailed on Mar. 26, 2024 in a counterpart Japanese patent application No. 2021-040943 with English Translation.

Japanese Office Action (JPOA) mailed on Aug. 26, 2023 in a counterpart Japanese patent application No. 2023-039689 with English Translation.

Written Directive mailed on Aug. 26, 2023 in a counterpart Japanese patent application No. 2021-040943 with English Translation.

Written Directive mailed on Aug. 26, 2023 in a counterpart Japanese patent application No. 2023-039689 with English Translation.

* cited by examiner

LIGHT GUIDE PLATE DEVICE INCLUDING OPTICAL PATH CHANGER

CROSS-REFERENCE TO RELATED APPLICATION

This application claims priority to Japanese Patent Application No. 2021-040943 filed on Mar. 15, 2021, the contents of which are incorporated herein by reference.

FIELD

The disclosure relates to a light guide plate device for displaying a stereoscopic image in a space.

BACKGROUND

A known stereoscopic image display device internally guides light from a light source, reflects the guided light using a reflector, and forms a stereoscopic image.

For example, the technique described in Patent Literature 1 uses a light guide plate and multiple light convergence members. The light guide plate guides light within a plane parallel to an emission surface. The light convergence members each have an optical face that receives light guided by the light guide plate to be emitted through the emission surface in a direction in which the light substantially converges at a single convergence point or a single convergence line in a space or in a direction in which the light substantially diverges from a single convergence point or a single convergence line in a space. The light convergence members each extend along a predetermined line within a plane parallel to the emission surface. The light convergence members each have a different convergence point or convergence line. A set of multiple convergence points or convergence lines forms a stereoscopic image in a space.

CITATION LIST

Patent Literature

Patent Literature 1: Japanese Unexamined Patent Application Publication No. 2016-114929

SUMMARY

The technique described in Patent Literature 1 allows a stereoscopic image to be viewable in a predetermined angle range in a direction perpendicular to the direction in which light enters the light guide plate. The shape of the stereoscopic image does not change greatly when viewed from a different viewpoint in the predetermined angle range, allowing the design to remain the same. However, the technique described in Patent Literature 1 does not respond to changes in the viewpoint in a direction parallel to the light incidence direction. Thus, when the direction of the viewpoint deviates from an expected direction parallel to the light incidence direction, the stereoscopic image is distorted, thus deteriorating the design.

One or more embodiments are directed to a light guide plate device that may reduce design deterioration in a stereoscopic image resulting from a change in the viewpoint.

A light guide plate device according to one or more embodiments may include an incident surface that receives light from a light source, and at least one optical path changer at a predetermined position on a back surface perpendicular to the incident surface. The at least one optical path changer reflects light incident through the incident surface and guided to be emitted through an emission surface parallel to the back surface. The light guide plate device causes light reflected by the at least one optical path changer to form an image in a space including the back surface. The light guide plate device forms a formed image including a near formed image at an imaging position within a predetermined distance from the back surface and a distant formed image at an imaging position more distant than the predetermined distance from the back surface. The near formed image includes an image formation area with a larger total area than an image formation area of the distant formed image.

The light guide plate device with the above structure forms an image with light received through the incident surface, reflected by the optical path changer arranged on the back surface, and emitted through the emission surface. In the formed image, the image formation area of the near formed image with its imaging position within the predetermined distance from the back surface has a larger total area than the image formation area of the distant formed image with its imaging position more distant than the predetermined distance from the back surface. The near formed image has a smaller amount of distortion resulting from a change in the viewpoint in a direction parallel to the light incidence direction than the distant formed image. The above described structure may reduce design deterioration in the stereoscopic image resulting from a change in the viewpoint.

In a light guide plate device according to one or more embodiments, a predetermined distance may be 25% or less of a distance from the back surface to a most distant imaging position of the distant formed image from the back surface.

In a light guide plate device according to one or more embodiments, a predetermined distance may be 50% or less of an average of distances from the back surface to imaging positions of image formation areas of the formed image.

In a light guide plate device according to one or more embodiments, a predetermined distance may be 12 mm from the back surface in a light emission direction and may be 24 mm from the back surface in a direction opposite to the light emission direction.

In a light guide plate device according to one or more embodiments, a predetermined distance may be 20% or less of a minimum distance between the incident surface and the at least one optical path changer.

In a light guide plate device according to one or more embodiments, a predetermined distance may be 20% or less of a longer maximum length of a maximum length of a projected image area of the formed image on the back surface in a direction perpendicular to the incident surface and a maximum length of the projected image area in a direction parallel to the incident surface.

In the above structures, the predetermined distance defining the area of an image to be the near formed image is determined appropriately. In a formed image based on the predetermined distance, the near formed image has an image formation area with a larger total area than an image formation area of the distant formed image. The above described structure may reduce design deterioration in the stereoscopic image resulting from a change in the viewpoint in a direction parallel to the light incidence direction.

In a light guide plate device according to one or more embodiments, the near formed image may have a higher luminous intensity than the distant formed image.

In a light guide plate device according to one or more embodiments, the near formed image may have a higher luminance level than the distant formed image.

In the above structure, the near formed image having a smaller amount of distortion resulting from a change in the viewpoint in a direction parallel to the light incidence direction is more easily viewable than the distant formed image having a larger amount of distortion resulting from a change in the viewpoint. The above described structure may cause less visible design deterioration in the stereoscopic image.

In the light guide plate device according to one or more embodiments, the near formed image may include a plane image.

A plane image typically has a larger image formation area than a line image. In the above structure, the near formed image includes a plane image and thus has a larger image formation area than a near formed image including no plane image, which may reduce design deterioration in the stereoscopic image resulting from a change in the viewpoint in a direction parallel to the light incidence direction.

In a light guide plate device according to one or more embodiments, the plane image may have an area of 30% or greater of a total area of image formation areas of the formed image.

In the above structure, the near formed image has a larger image formation area than a plane image having an area of less than 30% of the total area of the image formation area of the formed image, which may reduce design deterioration in the stereoscopic image resulting from a change in the viewpoint in a direction parallel to the light incidence direction.

In a light guide plate device according to one or more embodiments, the distant formed image may be a line image.

In the above structure, the distant formed image has a smaller image formation area than a distant formed image including a plane image. Such an arrangement may reduce design deterioration in the stereoscopic image resulting from a change in the viewpoint in a direction parallel to the light incidence direction.

In a light guide plate device according to one or more embodiments, the formed image may have an area of 50% or greater of a total area of image formation areas on the back surface.

In a near formed image, an image on the back surface has a particularly small amount of distortion resulting from a change in the viewpoint in a direction parallel to the light incidence direction. In the above structure, the formed image has an area of 50% or greater of a total area of image formation areas on the back surface, thus reducing design deterioration in the stereoscopic image resulting from a change in the viewpoint.

In a light guide plate device according to one or more embodiments, the near formed image may have a greater viewing angle than the distant formed image.

In a above structure, the formed image having a smaller amount of distortion resulting from a change in the viewpoint in a direction parallel to the light incidence direction is viewable in a broader range than the formed image having a larger amount of such distortion. The above described structure may cause less noticeable design deterioration.

In a light guide plate device according to one or more embodiments, the at least one optical path changer may include an optical path changer to form the near formed image and an optical path changer to form the distant formed image.

Emission light reflected by the optical path changer to form the near formed image may have a greater divergence angle than emission light reflected by the optical path changer to form the distant formed image.

In the above structure, light reflected by the optical path changer for forming the near formed image spreads more widely than light reflected by the optical path changer for forming the distant formed image. The optical path changer to form the near formed image can thus be smaller, which may allow the viewing angle for the near formed image to be greater.

In a light guide plate device according to one or more embodiments, the near formed image may have a higher resolution than the distant formed image.

In the above structure, a formed image having a smaller amount of distortion resulting from a change in the viewpoint in a direction parallel to the light incidence direction may have a higher resolution than an image having a larger amount of such distortion.

A light guide plate device according to one or more embodiments may reduce design deterioration in a stereoscopic image resulting from a change in the viewpoint.

DETAILED DESCRIPTION

First Embodiment

One or more embodiments will now be described with reference to the drawings. For ease of explanation, the positive X-direction in FIG. 1 may be referred to as the rightward direction, the negative X-direction as the leftward direction, the positive Y-direction as the upward direction, the negative Y-direction as the downward direction, the positive Z-direction as the frontward direction, and the negative Z-direction as the rearward direction. The positive Y-direction may also be referred to as the light incidence direction, and the positive Z-direction as the light emission direction.

1. Example Use

Figure 1:
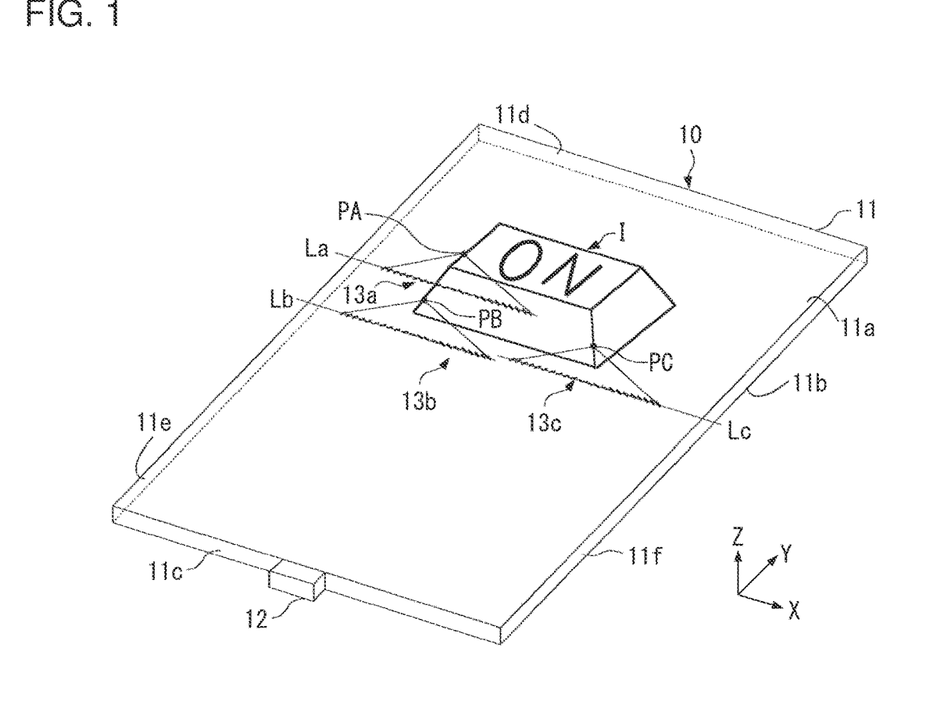
FIG. 1 is a diagram illustrating a perspective view of a light guide plate showing an example use according to one or more embodiments.

FIG. 1 is a perspective view of a light guide plate 11 with initial reference to which to one or more embodiments showing an example use will be described. In FIG. 1, a display device 10 including the light guide plate 11 displays a stereoscopic image I, or more specifically, a stereoscopic image I of a button (protruding in the positive Z-direction) showing the word ON. As shown in FIG. 1, the display device 10 includes the light guide plate 11 (light guide plate device) and a light source 12.

The light guide plate 11 has a rectangular parallelepiped shape and is formed from a transparent resin material with a relatively high refractive index. The material for the light guide plate 11 may be a polycarbonate resin, a polymethyl methacrylate resin, or glass. The light guide plate 11 has an emission surface 11a for light emission, a back surface 11b parallel to and opposite to the emission surface 11a, and four end faces 11c, 11d, 11e, and 11f. The end face 11c is an incident surface through which light emitted from the light source 12 enters the light guide plate 11. Hereafter, the end face 11c will also be referred to as the incident surface 11c. The end face 11d is opposite to the end face 11c. The end face 11e is opposite to the end face 11f. The light guide plate 11 guides light from the light source 12 to diverge within a plane parallel to the emission surface 11a. The light source 12 is, for example, a light-emitting diode (LED).

The light guide plate 11 includes multiple optical path changers on the back surface 11b, including an optical path changer 13a, an optical path changer 13b, and an optical path changer 13c. Hereafter, the multiple optical path changers including the optical path changer 13a, the optical path changer 13b, and the optical path changer 13c may also be collectively referred to as the optical path changers 13. The optical path changers 13 are located at predetermined positions on the back surface 11b perpendicular to the incident surface 11c. The optical path changers 13 reflect light entering through the incident surface 11c and guided to be emitted through the emission surface 11a parallel to the back surface 11b. The optical path changers 13 at the predetermined positions are arranged substantially sequentially and extend in X-direction. More specifically, as shown in FIG. 1, the optical path changer 13a is arranged along a line La, the optical path changer 13b is arranged along a line Lb, and the optical path changer 13c is arranged along a line Lc. The lines La, Lb, and Lc are straight and substantially parallel to X-direction. Any optical path changers 13 are arranged substantially sequentially along straight lines parallel to X-direction. In other words, the optical path changers 13 are arranged along predetermined lines within a plane parallel to the back surface 11b. Each optical path changer 13 receives, across its length in X-direction, the light emitted from the light source 12 and guided by the light guide plate 11. The optical path changer 13 substantially converges light incident at positions across the length of each optical path changer 13 to a fixed point corresponding to the optical path changer 13. FIG. 1 shows the convergence of light reflected by the optical path changer 13a, the optical path changer 13b, and the optical path changer 13c, among the optical path changers 13.

More specifically, light from positions across the length of the optical path changer 13a converges at a fixed point PA included in the stereoscopic image I. Thus, the wave surface of light from the optical path changer 13a appears to be the wave surface of light emitted from the fixed point PA. Light from positions across the length of the optical path changer 13b converges at a fixed point PB included in the stereoscopic image I. Thus, the wave surface of light from the optical path changer 13b appears to be the wave surface of light emitted from the fixed point PB. Light from positions across the length of the optical path changer 13c converges similarly to the light from positions across the length of the optical path changers 13a and 13b. Accordingly, light from positions across the length of an optical path changer 13 substantially converges at a fixed point corresponding to the optical path changer 13. Any optical path changer 13 thus provides the wave surface of light that appears to be emitted from the corresponding fixed point. Different optical path changers 13 correspond to different fixed points. A set of multiple fixed points corresponding to the optical path changers 13 forms a stereoscopic image I viewable by the user in a space (more specifically, in a space above the emission surface 11a of the light guide plate 11). In other words, the light guide plate 11 causes light reflected by the optical path changers 13 to form a stereoscopic image I in a space including the back surface 11b.

2. Example Structure

Figure 2:
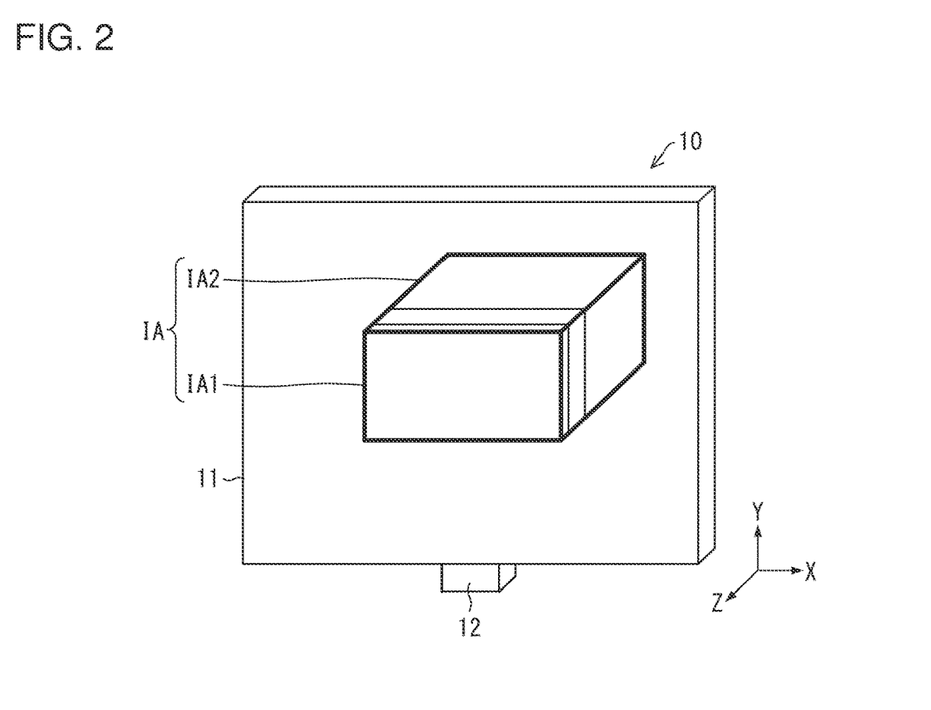
FIG. 2 is a diagram illustrating a perspective view of a light guide plate showing an example structure according to one or more embodiments.

FIG. 2 is a perspective view of the light guide plate 11 according to the present embodiment showing its example structure. An example structure of the light guide plate 11 according to one or more embodiments will now be described with reference to the drawings.

In the example shown in FIG. 2, light emitted from the light guide plate 11 forms a stereoscopic image IA (formed image) viewable by the user in a space. For ease of explanation, the portion of the stereoscopic image IA appearing frontward from the back surface 11b, or the real image, as well as the portion of the stereoscopic image IA appearing rearward from the back surface 11b, or the virtual image, are each referred to as a portion or image being formed. More specifically, the light guide plate 11 in FIG. 2 includes multiple optical path changers 13 on the back surface 11b to display the stereoscopic image IA. The stereoscopic image IA has a rectangular parallelepiped shape. The stereoscopic image IA includes a near formed image IA1 and a distant formed image IA2. The near formed image IA1 is a stereoscopic image included in the stereoscopic image IA and is at a position within a predetermined distance from the back surface 11b. The distant formed image IA2 is a stereoscopic image included in the stereoscopic image IA and is at a position more distant than the predetermined distance (described later) from the back surface 11b.

In the stereoscopic image IA, the image formation area of the near formed image IA1 has a larger total area than the image formation area of the distant formed image IA2. The near formed image IA1 has a smaller amount of distortion resulting from a change in the viewpoint in a direction parallel to the light incidence direction than the distant formed image IA2. The light guide plate 11 thus reduces design deterioration in the stereoscopic image IA resulting from a change in the viewpoint. The total area of the image formation area can be calculated by totaling the areas of fixed points included in the image formation area.

3. Operation Examples

Figure 3:
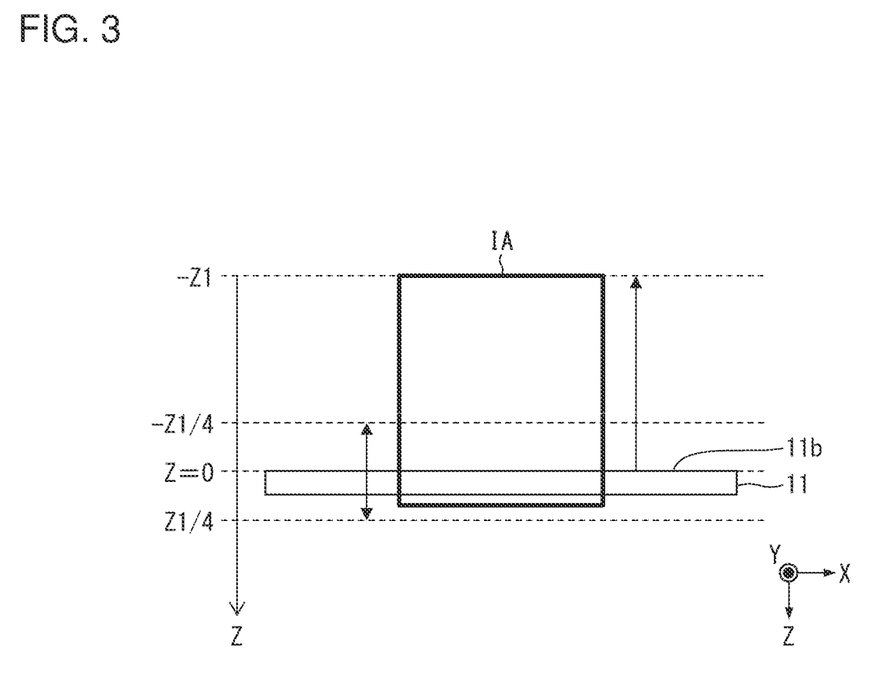
FIG. 3 is a diagram illustrating a plan view of a light guide plate showing an operation example according to one or more embodiments.

FIG. 3 is a plan view of the light guide plate 11 according to the present embodiment showing its operation example. In FIG. 3, the back surface 11b of the light guide plate 11 is at a position represented as Z=0. As shown in FIG. 3, the predetermined distance may be 25% or less of the distance from the back surface 11b to the most distant imaging position of the stereoscopic image IA from the back surface 11b. In other words, when the distance from the back surface 11b to the most distant imaging position in the stereoscopic image IA in Z-direction is defined as Z1, the predetermined distance may be ¼ of the distance Z1. The image formed in the area from the position Z=−(Z1)/4 to Z=(Z1)/4 in Z-direction is the near formed image IA1.

Figure 4:
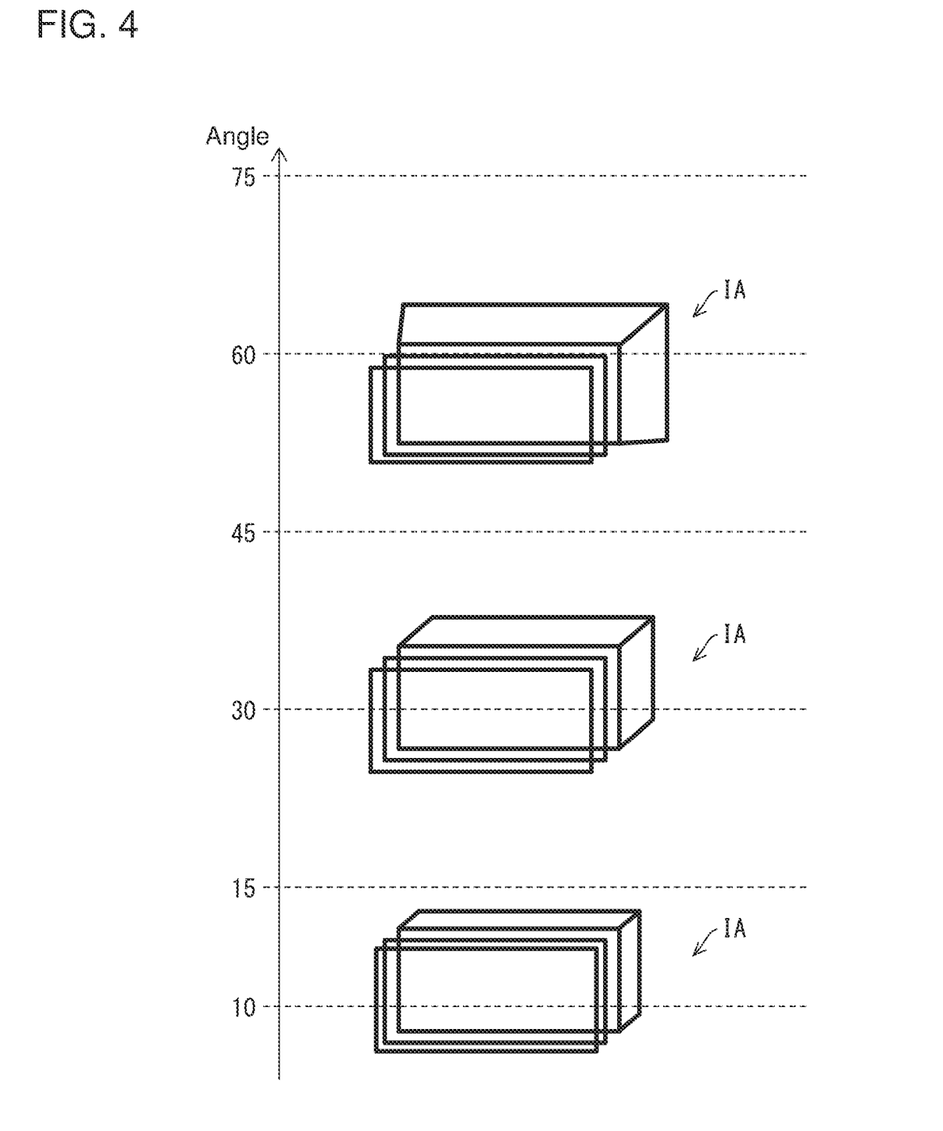
FIG. 4 is a diagram illustrating examples of an appearance of a stereoscopic image in accordance with a viewing angle.

FIG. 4 is a diagram showing examples of the appearance of the stereoscopic image IA in accordance with the viewing angle. The viewing angle refers to the angle formed by the line of sight of the user and a plane parallel to the incident surface 11c and including a center of the light guide plate 11 in Y-direction. FIG. 4 shows the appearance of the stereoscopic image IA with the viewing angles of 10, 30, and 60 degrees. In the example in FIG. 4, the light guide plate 11 is designed to allow the stereoscopic image IA to be viewable most appropriately at the viewing angle (design angle) of 30 degrees. The design angle is changeable in accordance with the use of the light guide plate 11.

In the example in FIG. 4, the stereoscopic image IA includes an image having a substantially rectangular parallelepiped shape and two plane images in front. A front portion of the substantially rectangular parallelepiped shape corresponds to the near formed image IA1. A rear portion of the substantially rectangular parallelepiped shape corresponds to the distant formed image IA2. The two plane images frontward also correspond to the distant formed image IA2. As shown in FIG. 4, the stereoscopic image IA with the viewing angle of 60 degrees or 10 degrees is distorted from the stereoscopic image IA with the designed viewing angle of 30 degrees. The portion corresponding to the near formed image IA1 has a smaller amount of distortion than the portion corresponding to the distant formed image IA2. Thus, the near formed image IA1 with a smaller total area of its image formation area than the distant formed image IA2 reduces distortion of the entire stereoscopic image IA, or in other words, reduces design deterioration in the stereoscopic image IA.

The predetermined distance may be 50% or less of the average of distances from the back surface 11b to the imaging positions of the image formation areas of the stereoscopic image IA. The predetermined distance may be 12 mm from the back surface 11b in the light emission direction and 24 mm from the back surface 11b in a direction opposite to the light emission direction.

The predetermined distance may be 20% or less of a minimum distance between the incident surface 11c and the optical path changers 13. Light incident on an optical path changer 13 located at a shorter distance from the incident surface 11c diverges more, which is likely to cause design deterioration when a viewpoint changes. The predetermined distance can be determined as described above in accordance with the minimum distance between the incident surface 11c and the optical path changers 13 to reduce design deterioration in the stereoscopic image IA formed with the light guide plate 11 including the optical path changers 13.

The predetermined distance may be 20% or less of a longer one of a maximum length of a projected image area of the stereoscopic image IA on the back surface 11b in a direction perpendicular to the incident surface 11c and a maximum length of the projected image area in a direction parallel to the incident surface 11c.

In the above structures, the predetermined distance defining the area of an image to be the near formed image IA1 is determined appropriately. In the formed stereoscopic image IA based on the predetermined distance, the near formed image IA1 has an image formation area with a larger total area than an image formation area of the distant formed image IA2, which reduces design deterioration in the stereoscopic image IA resulting from a change in the viewpoint in a direction parallel to the light incidence direction.

The optical path changers 13 for imaging positions frontward from the back surface 11b spread reflected light more laterally than the optical path changers 13 for imaging positions rearward from the back surface 11b. Thus, light reflected by multiple optical path changers 13 is more likely to appear to be superimposed in the area in the stereoscopic image IA frontward from the back surface 11b than in the area in the stereoscopic image IA rearward from the back surface 11b. Such a structure is more likely to cause blurring in the stereoscopic image IA and design deterioration in the stereoscopic image IA due to the blurring.

In the above example, the predetermined distance may be 12 mm from the back surface 11b in the light emission direction and 24 mm from the back surface 11b in a direction opposite to the light emission direction. Similarly, the predetermined distance may be shorter in the light emission direction than the predetermined distance in a direction opposite to the light emission direction. The predetermined distance determined in such a manner can cause less blurring in the stereoscopic image IA particularly frontward from the back surface 11b and less design deterioration in the stereoscopic image IA due to the blurring.

In the above example, the optical path changers 13 are located on the back surface 11b. The near formed image IA1 and the distant formed image IA2 are thus divided based on the distance from the back surface 11b. However, when the optical path changers 13 are located on another surface different from the back surface 11b, the near formed image IA1 and the distant formed image IA2 may be divided based on the distance from the other surface.

Figure 16:
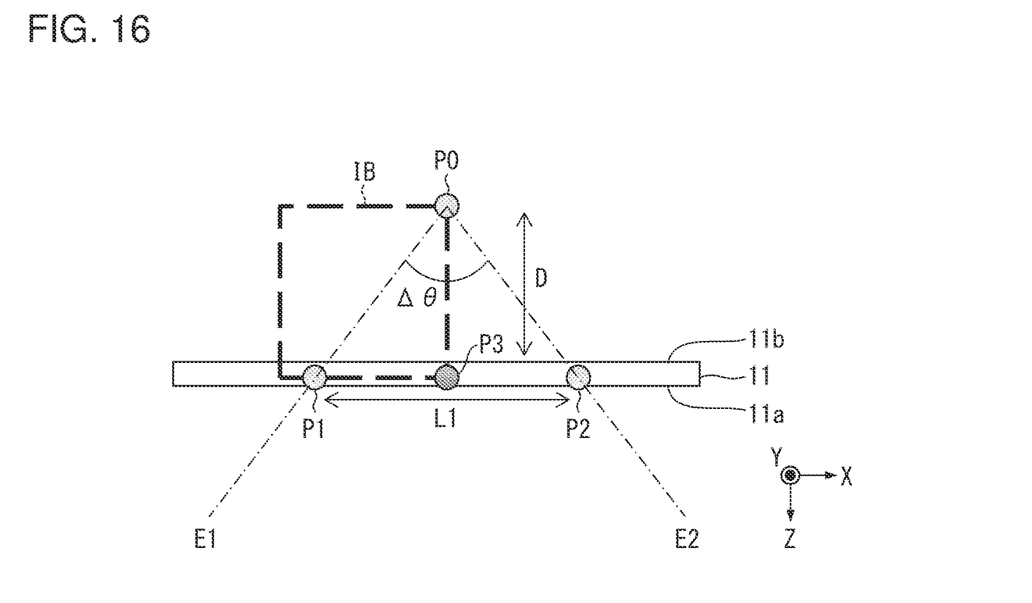
FIG. 16 is a diagram illustrating to describe a method for deriving a depth of an imaging point in a stereoscopic image formed rearward from a light guide plate.

FIG. 16 is a diagram describing a method for deriving a depth D of an imaging point P0 in a stereoscopic image IB formed rearward from the light guide plate 11. The stereoscopic image IB is substantially cubic. A method for deriving the depth D of the point P0 will now be described with reference to FIG. 16.

To derive the depth D of the point P0, the stereoscopic image IB is viewed from two viewpoints E1 and E2. The viewpoints E1 and E2 correspond to the left eye and the right eye of a user viewing the stereoscopic image IB. The point P0 projected on the emission surface 11a of the light guide plate 11 as viewed from the viewpoint E1 is defined as a point P1. The point P0 projected on the emission surface 11a of the light guide plate 11 as viewed from the viewpoint E2 is defined as a point P2. When the distance between the point P1 and the point P2 is defined as L1, and the angle between the viewpoints E1 and E2 with respect to the point P0 is defined as Δθ, the depth D=L1/Δθ.

Figure 17:
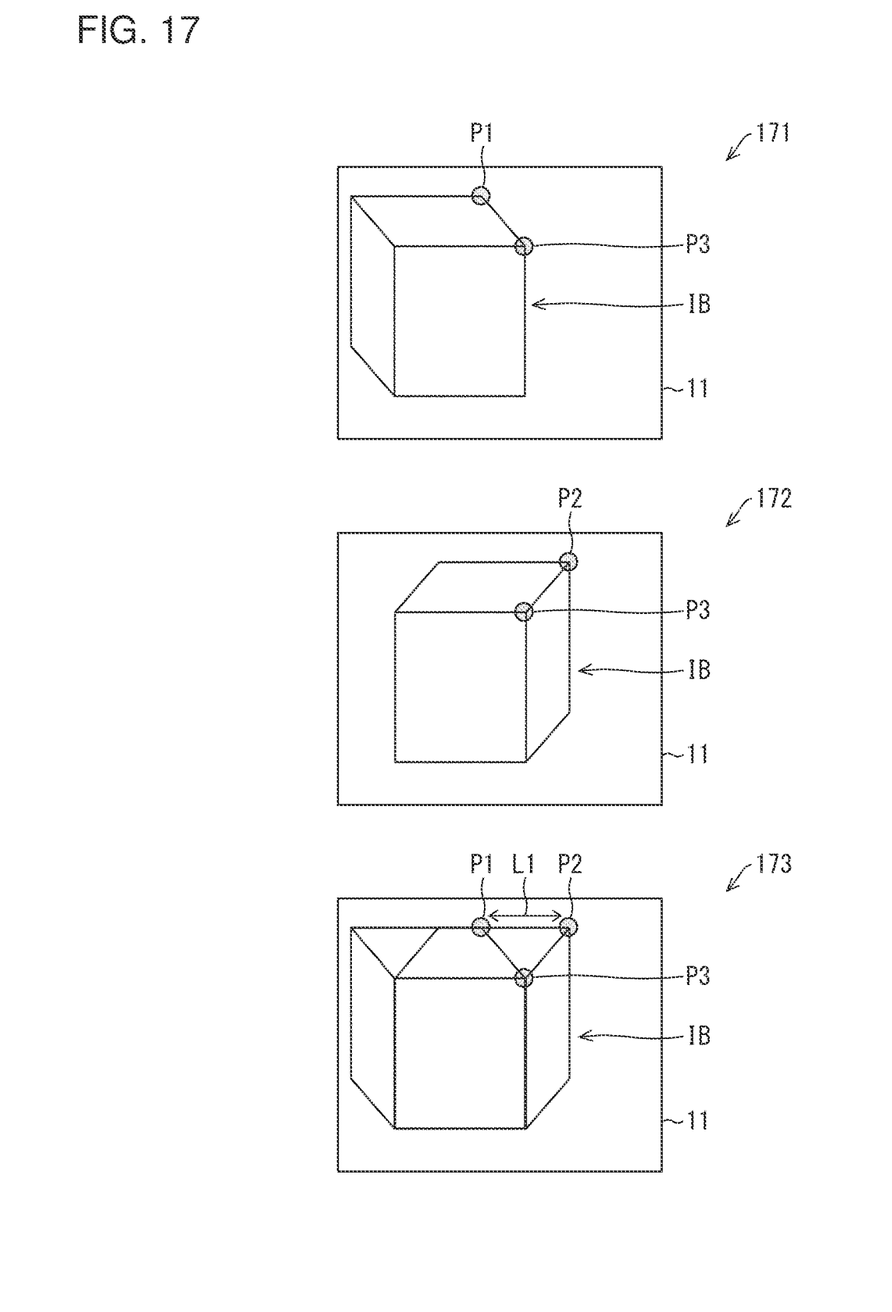
FIG. 17 is a diagram illustrating to describe a method for calculating a depth, such as of an imaging point as is shown in FIG. 16, through image analysis.

FIG. 17 is a diagram describing a method for calculating the depth D through image analysis. FIG. 17 shows the light guide plate 11 and the stereoscopic image IB viewed from the viewpoint E1 with reference numeral 171, the light guide plate 11 and the stereoscopic image IB viewed from the viewpoint E2 with reference numeral 172, and an image of the images denoted with reference numerals 171 and 172 superimposed on each other with reference numeral 173. A method for calculating the depth D through image analysis will now be described with reference to FIG. 17.

To calculate the depth D through image analysis, a point on the emission surface 11a is determined as a point P3. The point P3 may be any point included in the stereoscopic image IB formed on the emission surface 11a. The point P3 may be a point marked on the emission surface 11a without being included in the stereoscopic image IB. The point P3 on the emission surface 11a is at a constant position from any viewpoint position.

In the image analysis, the images with reference numerals 171 and 172 are superimposed on each other to have the same point P3 in each image as indicated by reference numeral 173. The point P3 on the emission surface 11a is at a constant position from any viewpoint position. Thus, the distance between the point P1 and the point P2 in the image with reference numeral 173 is equal to the distance L1 shown in FIG. 16. As described above, the depth D can thus be calculated as the depth D=L1/Δθ.

4. Modifications

One or more embodiments described in detail above are exemplary in all respects. Embodiments may be variously modified or altered without deviating from the scope of the invention. For example, one or more embodiments may be modified in the forms described below. The same components as those in the above described embodiment or embodiments are hereafter given the same reference numerals, and the operations that are the same as those in the above embodiment will not be described. The modifications described below may be combined as appropriate.

4.1

Figure 5:
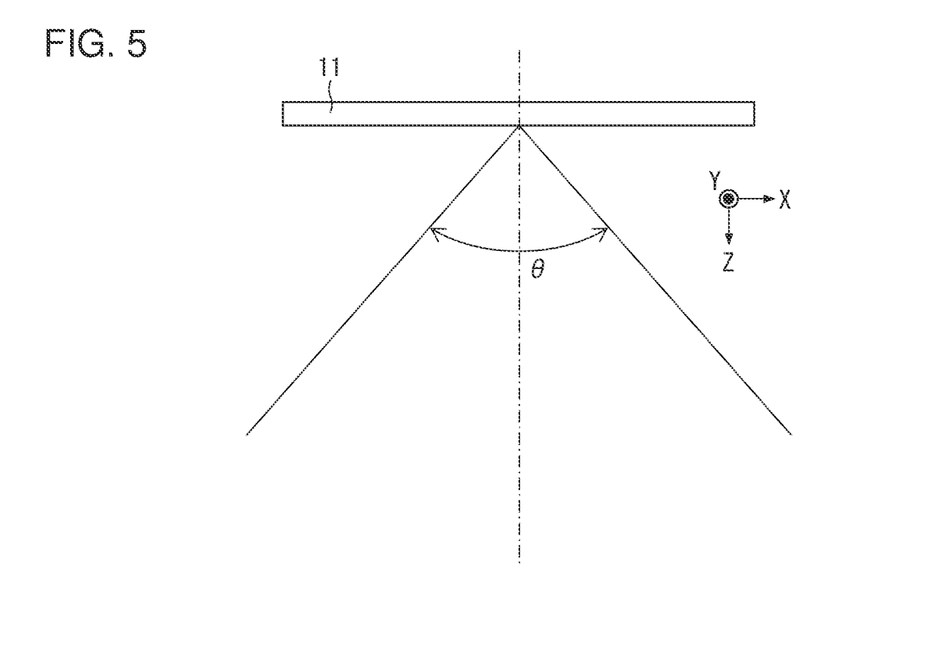
FIG. 5 is a diagram illustrating a light guide plate according to a first modification of one or more embodiments.

FIG. 5 is a diagram of a light guide plate 11 according to a first modification. In the present modification, the luminous intensity and the luminance level of the near formed image IA1 and the distant formed image IA2 will be described. The luminous intensity (cd) herein refers to the amount of light (luminous flux) per unit solid angle. The luminance level (cd/m$^2$) refers to the amount of light (luminous flux) per unit solid angle and unit area. FIG. 5 shows a viewing angle θ of the light guide plate 11. The viewing angle θ is an index indicating the range of angles at which the screen of, for example, a liquid crystal display being viewed at an angle is properly viewable. The viewing angle θ is an angle with respect to the front in which the screen is properly viewable. The viewing angle θ is defined as the range of angles formed by a perpendicular line to the emission surface 11a of the light guide plate 11 and the line of sight of the user.

Within the viewing angle θ, the near formed image IA1 may have a higher luminous intensity than the distant formed image IA2. The near formed image IA1 may have a higher luminance level than the distant formed image IA2. In the above structure, the near formed image IA1 having a smaller amount of distortion resulting from a change in the viewpoint in the direction parallel to the light incidence direction is more easily viewable than the distant formed image IA2 having a larger amount of distortion resulting from a change in the viewpoint. The above described structure causes less visible design deterioration in the stereoscopic image IA.

The near formed image IA1 may not have a higher luminous intensity and a higher luminance level than the distant formed image IA2 within the entire viewing angle θ. The near formed image IA1 may have a higher luminous intensity and a higher luminance level than the distant formed image IA2 within a large range of the viewing angle θ.

For example, the near formed image IA1 may have a higher luminous intensity and a higher luminance level than the distant formed image IA2 in the range of 50% or greater of the viewing angle θ. When, for example, the viewing angle θ is ±40 degrees with respect to a perpendicular line to the emission surface 11a, the near formed image IA1 may have a higher luminous intensity and a higher luminance level than the distant formed image IA2 in the range of ±20 degrees or greater. In another example, the near formed image IA1 may have a higher luminous intensity and a higher luminance level than the distant formed image IA2 in the range of 75% or greater of the viewing angle θ. When, for example, the viewing angle θ is ±40 degrees with respect to a perpendicular line to the emission surface 11a, the near formed image IA1 may have a higher luminous intensity and a higher luminance level than the distant formed image IA2 in the range of ±30 degrees or greater.

The relationships of the luminous intensity and the luminance level between the near formed image IA1 and the distant formed image IA2 described above may hold between the entire near formed image IA1 and the entire distant formed image IA2. More specifically, the relationships described above may not hold for each fixed point included in image formation areas of the near formed image IA1 and the distant formed image IA2.

4.2

Figure 6:
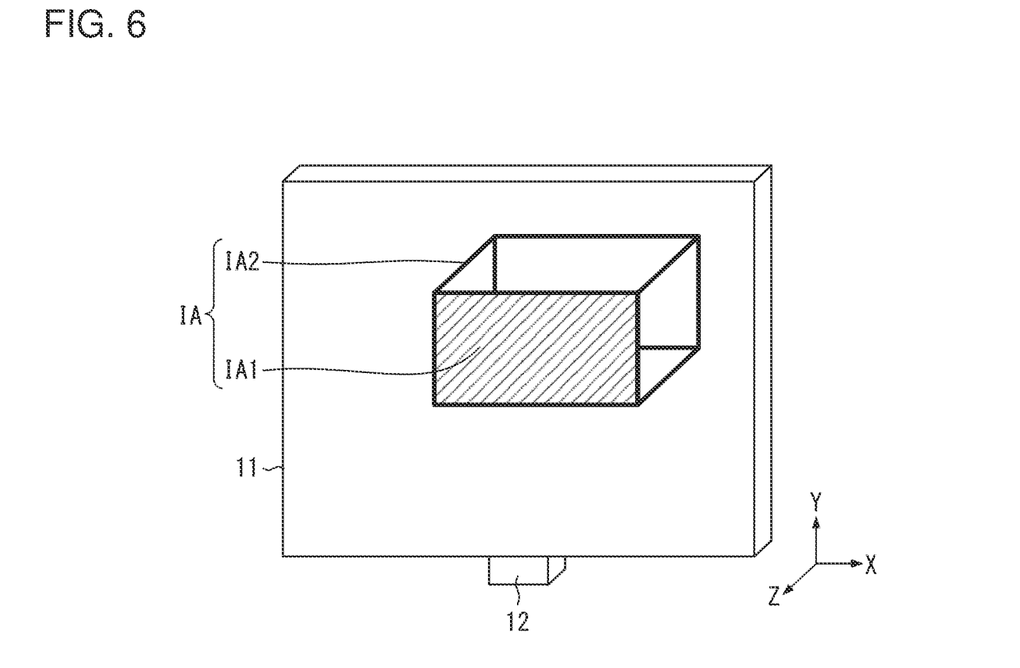
FIG. 6 is a perspective view of a light guide plate according to a second modification of one or more embodiments.
Figure 7:
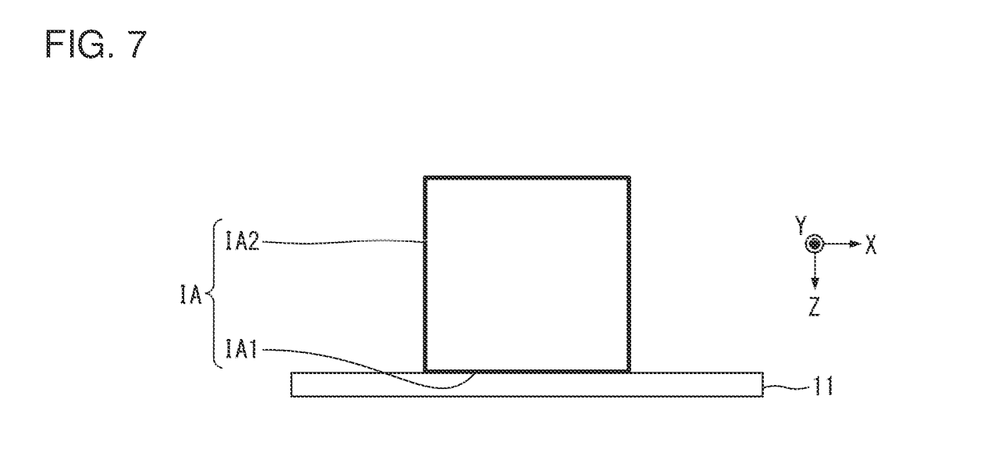
FIG. 7 is a diagram illustrating a plan view of a light guide plate, such as is shown in FIG. 6, according to one or more embodiments.

FIG. 6 is a perspective view of a light guide plate 11 according to a second modification. FIG. 7 is a plan view of the light guide plate 11 shown in FIG. 6. As shown in FIG. 6 and FIG. 7, the near formed image IA1 may include a plane image. A plane image herein refers to an image representing a surface and having imaging points with a density of at least 30% per unit area in an imaging plane. A plane image also has the brightest point with a full width at half maximum (FWHM) of greater than 2 mm. Thus, a plane image may be entirely solid or may be, for example, hatched.

A plane image typically has a larger image formation area than a line image. In the above structure, the near formed image IA1 includes a plane image and thus has a larger image formation area than a near formed image IA1 including no plane image, which reduces design deterioration in the stereoscopic image IA resulting from a change in the viewpoint in a direction parallel to the light incidence direction.

The plane image in the near formed image IA1 may have an area of 30% or greater of the total area of the image formation area of the stereoscopic image IA. In the above structure, the near formed image IA1 has a larger image formation area than a near formed image IA1 including a plane image having an area of less than 30% of the total area of the image formation area of the stereoscopic image IA, which reduces design deterioration in the stereoscopic image resulting from a change in the viewpoint in a direction parallel to the light incidence direction.

As shown in FIG. 6 and FIG. 7, the distant formed image IA2 may be a line image. A line image herein has the brightest point with an FWHM of less than or equal to 2 mm. In the above structure, the distant formed image IA2 has a smaller image formation area than a distant formed image IA2 including a plane image, which reduces design deterioration in the stereoscopic image IA resulting from a change in the viewpoint in a direction parallel to the light incidence direction.

As shown in FIG. 7, the stereoscopic image IA may have an area of 50% or greater of the total area of the image formation area on the back surface 11b. In the stereoscopic image IA, an area on the back surface 11b has a particularly small amount of distortion resulting from a change in the viewpoint in a direction parallel to the light incidence direction. The above structure thus reduces design deterioration in the stereoscopic image IA resulting from a change in the viewpoint.

The near formed image IA1 may have a higher resolution than the distant formed image IA2. In the above structure, a formed image having a smaller amount of distortion resulting from a change in the viewpoint in a direction parallel to the light incidence direction can have a higher resolution than an image having a larger amount of such distortion.

4.3

Figure 8:
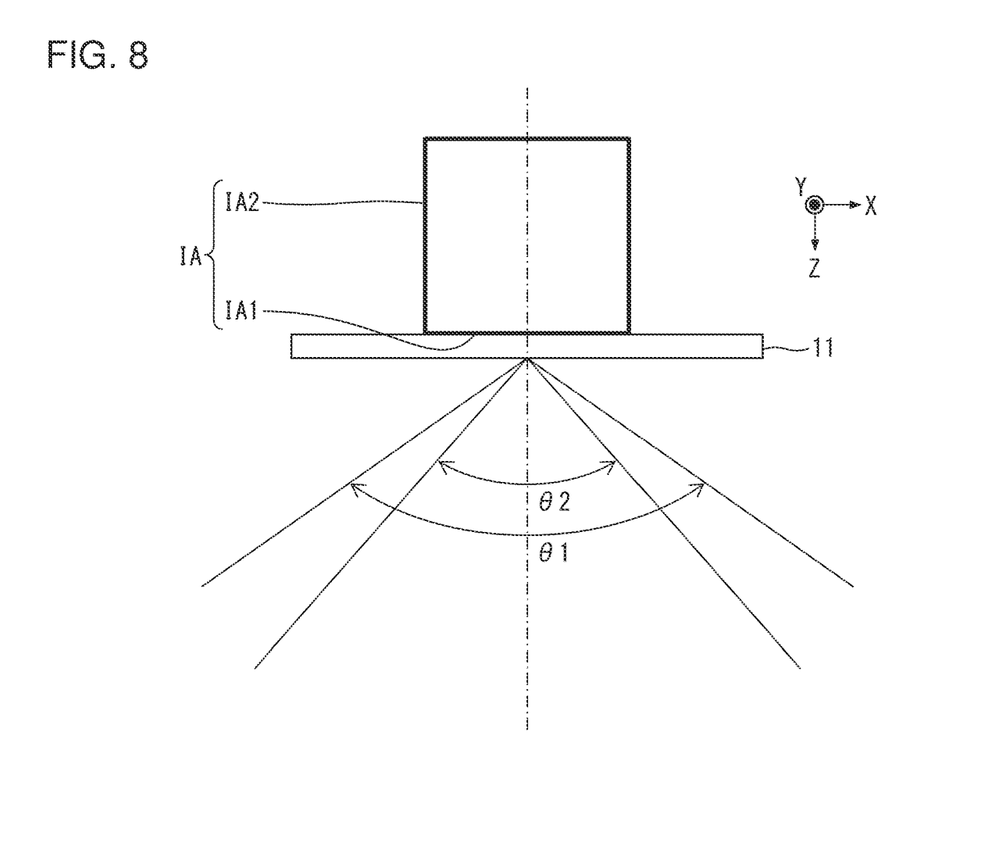
FIG. 8 is a diagram illustrating a light guide plate according to a third modification of one or more embodiments.

FIG. 8 is a diagram of a light guide plate 11 according to a third modification. FIG. 8 shows two viewing angles θ1 and θ2. The viewing angle θ1 is a viewing angle for the near formed image IA1. The viewing angle θ2 is a viewing angle for the distant formed image IA2. As shown in FIG. 8, the viewing angle θ1 for the near formed image IA1 may be greater than the viewing angle θ2 for the distant formed image IA2.

In the above structure, the near formed image IA1 having a smaller amount of distortion resulting from a change in the viewpoint in a direction parallel to the light incidence direction is viewable in a broader range than the distant formed image IA2 having a larger amount of such distortion. Such a structure causes less visible design deterioration of the entire stereoscopic image IA.

4.4

Figure 9:
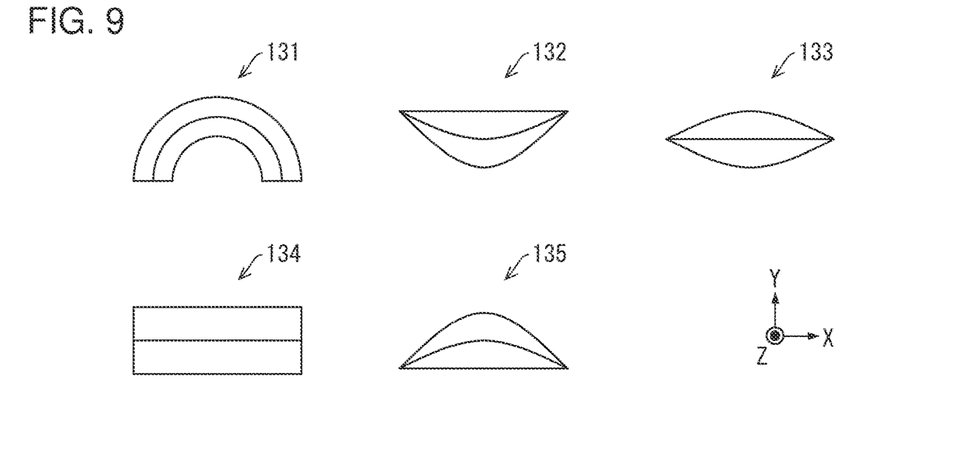
FIG. 9 is a diagram illustrating to describe a light guide plate according to a fourth modification of one or more embodiments.

FIG. 9 is a diagram describing a light guide plate 11 according to a fourth modification. In FIG. 9, the optical path changers 13 have example shapes with reference numerals 131 to 135. Emission light reflected by the optical path changers 13 with reference numerals 131 to 133 has a greater divergence angle than emission light reflected by the optical path changers 13 with reference numerals 134 and 135.

The light guide plate 11 may include optical path changers 13 having shapes with reference numerals 131 to 133 for forming the near formed image IA1 and optical path changers 13 having a shape with reference numeral 134 or 135 for forming the distant formed image IA2. In the above described case, emission light reflected by each of the optical path changers 13 for forming the near formed image IA1 spreads more widely than emission light reflected by each of the optical path changers 13 for forming the distant formed image IA2. Each optical path changer 13 for forming the near formed image IA1 can thus be smaller. In other words, the optical path changers 13 can be arranged more densely, which allows use of optical path changers 13 for greater viewing angles, thus increasing the viewing angle for the near formed image IA1.

4.5

A display device 10A as a modification of the display device 10 will now be described.

Figure 10:
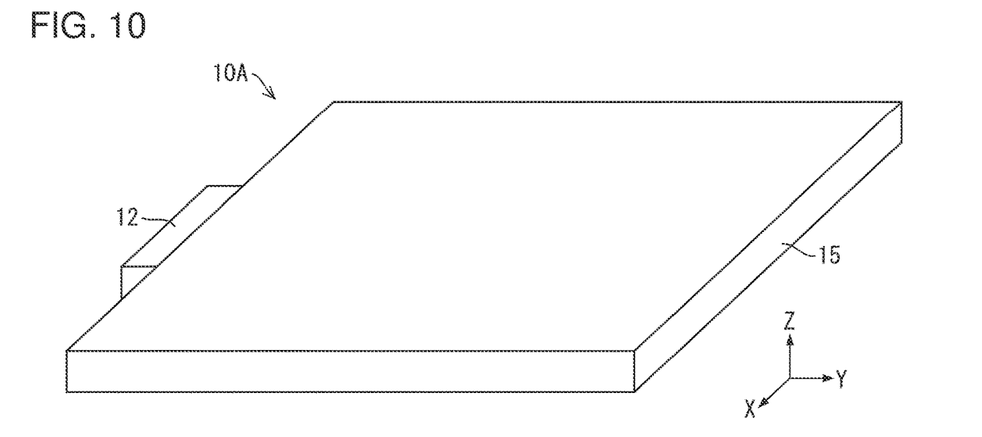
FIG. 10 is a diagram illustrating a perspective view of a display device according to a modification of one or more embodiments.

FIG. 10 is a perspective view of the display device 10A. As shown in FIG. 10, the display device 10A includes the light source 12 and a light guide plate 15. The light guide plate 15 is a modification of the light guide plate 11 described above.

Figure 11:
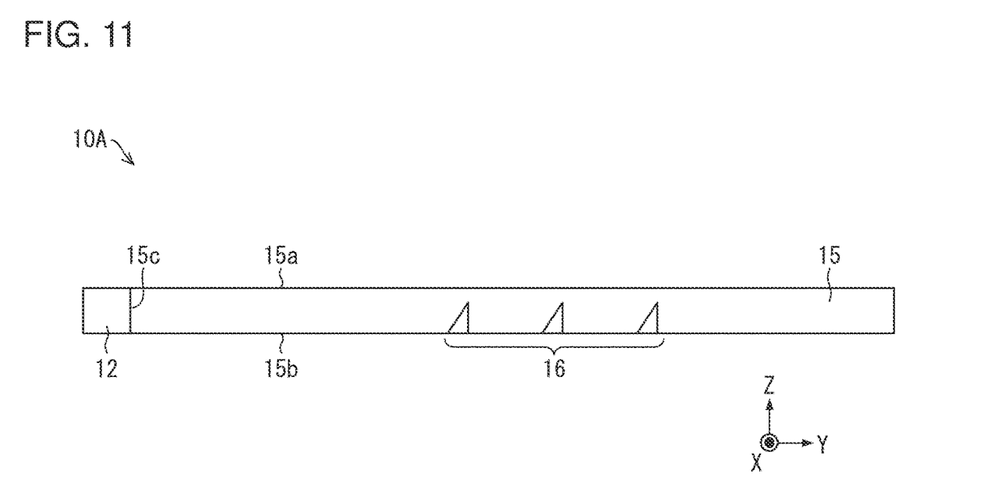
FIG. 11 is a diagram illustrating a cross-sectional view of a light guide plate device, such as is shown in FIG. 10, showing a structure of each optical path changer included in a light guide plate device.
Figure 12:
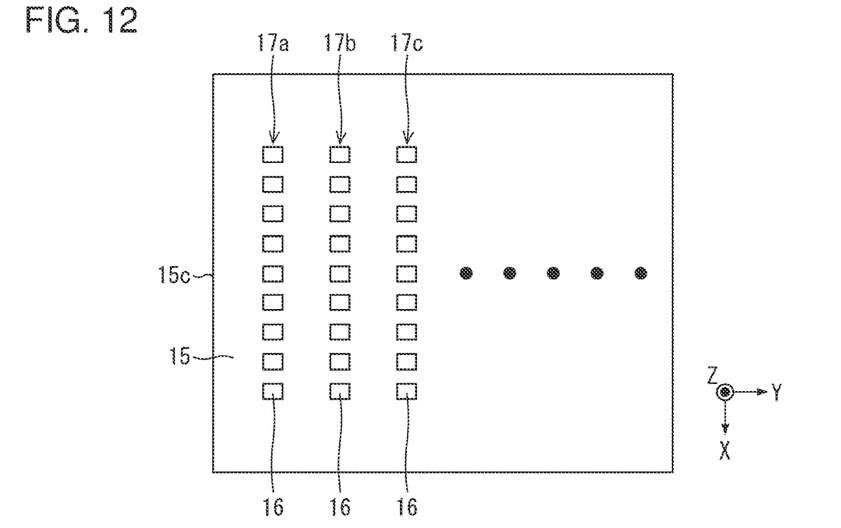
FIG. 12 is a diagram illustrating a plan view of a light guide plate device, such as is shown in FIG. 10, showing a structure.
Figure 13:
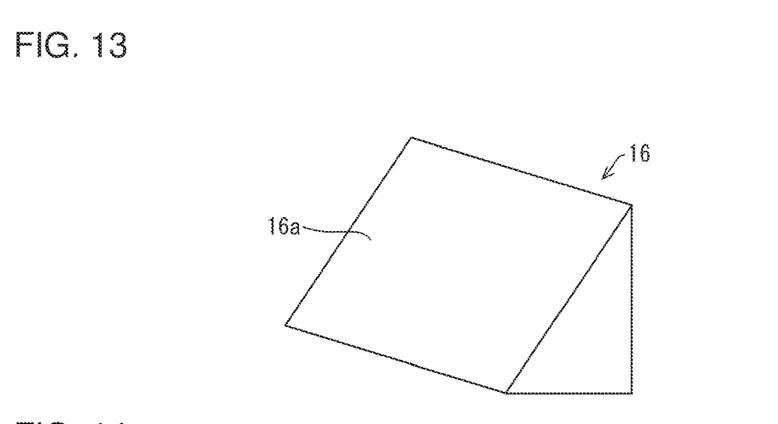
FIG. 13 is a diagram illustrating a perspective view of one of an optical path changers included in a light guide plate device, such as is shown in FIG. 10.

FIG. 11 is a cross-sectional view of the light guide plate 15 showing the structure of each optical path changer 16 included in the light guide plate 15. FIG. 12 is a plan view of the light guide plate 15 showing its structure. FIG. 13 is a perspective view of one of the optical path changers 16 included in the light guide plate 15.

The light guide plate 15 guides light (incident light) received from the light source 12. The light guide plate 15 is formed from a transparent resin material with a relatively high refractive index. The material for the light guide plate 15 may be a polycarbonate resin or a polymethyl methacrylate resin. In the present modification, the light guide plate 15 is formed from a polymethyl methacrylate resin. As shown in FIG. 11, the light guide plate 15 has an emission surface 15a, a back surface 15b, and an incident surface 15c.

The emission surface 15a allows light guided within the light guide plate 15 and redirected by the optical path changers 16 (described later) to be emitted. The emission surface 15a is a front surface of the light guide plate 15. The back surface 15b is parallel to the emission surface 15a and includes the optical path changers 16 (described later) arranged on the surface. The incident surface 15c receives light emitted from the light source 12 to allow the light to enter the light guide plate 15.

The light emitted from the light source 12 enters the light guide plate 15 through the incident surface 15c and is then totally internally reflected by the emission surface 15a or the back surface 15b and is guided within the light guide plate 15.

As shown in FIG. 11, the optical path changers 16 are arranged on the back surface 15b and inside the light guide plate 15. The optical path changers 16 redirect the light guided within the light guide plate 15 to be emitted through the emission surface 15a. The multiple optical path changers 16 are arranged on the back surface 15b of the light guide plate 15.

As shown in FIG. 12, the optical path changers 16 are arranged parallel to the incident surface 15c. As shown in FIG. 13, each optical path changer 16 is a triangular pyramid and has a reflective surface 16a that reflects (totally internally reflects) incident light. The optical path changer 16 may be, for example, a recess on the back surface 15b of the light guide plate 15. The optical path changer 16 may not be a triangular pyramid. As shown in FIG. 12, the light guide plate 15 includes multiple optical path changer sets 17a, 17b, 17c, . . . each including multiple optical path changers 16 on the back surface 15b.

Figure 14:
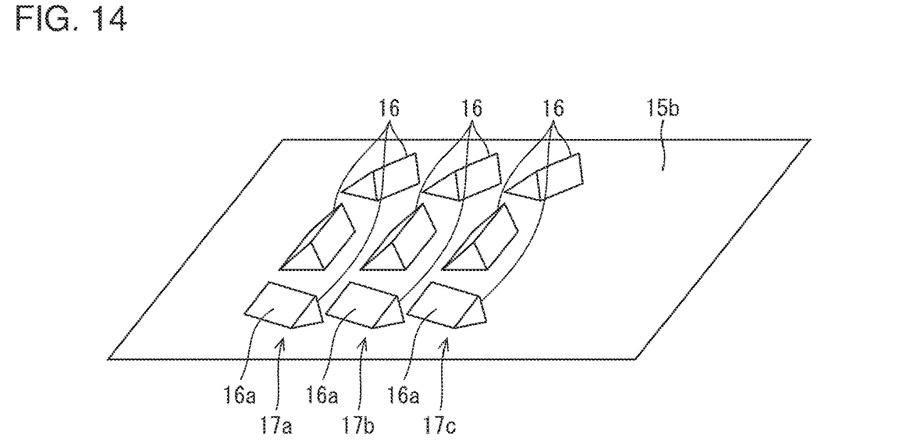
FIG. 14 is a diagram illustrating a perspective view of optical path changers with a structure, such as is shown in FIG. 13 showing an arrangement.

FIG. 14 is a perspective view of the optical path changers 16 showing their arrangement. As shown in FIG. 14, the optical path changer sets 17a, 17b, 17c, . . . each include multiple optical path changers 16 arranged on the back surface 15b of the light guide plate 15 with reflective surfaces 16a forming different angles with the direction of incident light. The above described arrangement allows the optical path changer sets 17a, 17b, 17c, . . . to redirect incident light to be emitted in various directions through the emission surface 15a.

The light guide plate 15 forming a stereoscopic image I will now be described with reference to FIG. 15. In the present example, light redirected by the optical path changers 16 is used to form the stereoscopic image I as a plane image on a stereoscopic imaging plane P perpendicular to the emission surface 15a of the light guide plate 15.

Figure 15:
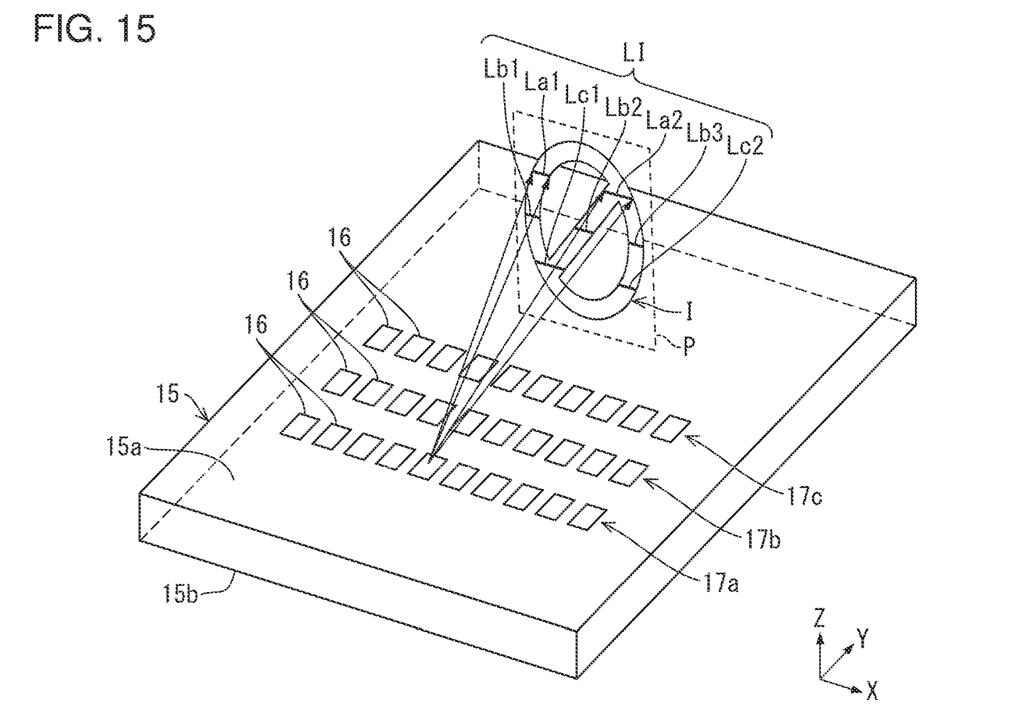
FIG. 15 is a diagram illustrating a perspective view of a light guide plate device, such as is shown in FIG. 10, describing a formation of a stereoscopic image.

FIG. 15 is a perspective view of the light guide plate 15 describing the formation of the stereoscopic image I. In the present example, the stereoscopic image I formed on the stereoscopic imaging plane P is a sign of a ring with a diagonal line inside.

In the light guide plate 15, for example, light redirected by each optical path changer 16 in the optical path changer set 17a intersects with the stereoscopic imaging plane P at a line La1 and a line La2 as shown in FIG. 15. The intersections with the stereoscopic imaging plane P form line images LI as part of the stereoscopic image I. The line images LI are parallel to the XZ plane. Accordingly, light from the multiple optical path changers 16 included in the optical path changer set 17a forms the line images LI of the line La1 and the line La2. The light forming the images of the line La1 and the line La2 may be provided by at least two of the optical path changers 16 in the optical path changer set 17a.

Similarly, light redirected by each optical path changer 16 in the optical path changer set 17b intersects with the stereoscopic imaging plane P at a line Lb1, a line Lb2, and a line Lb3. The intersections with the stereoscopic imaging plane P form line images LI as part of the stereoscopic image I.

Light redirected by each optical path changer 16 in the optical path changer set 17c intersects with the stereoscopic imaging plane P at a line Lc1 and a line Lc2. The intersections with the stereoscopic imaging plane P form line images LI as part of the stereoscopic image I.

The optical path changer sets 17a, 17b, 17c, . . . form line images LI at different positions in X-direction. The optical path changer sets 17a, 17b, 17c, . . . in the light guide plate 15 may be arranged at smaller intervals to form the line images LI at smaller intervals in X-direction. Thus, the light guide plate 15 combines the multiple line images LI formed by the light redirected by the optical path changers 16 in the optical path changer sets 17a, 17b, 17c, . . . to form the stereoscopic image I that is a substantially plane image on the stereoscopic imaging plane P.

The stereoscopic imaging plane P may be perpendicular to the X-, Y-, or Z-axis. The stereoscopic imaging plane P may not be perpendicular to the X-, Y-, or Z-axis. The stereoscopic imaging plane P may not be flat and may be curved.

Thus, the light guide plate 15 may form a stereoscopic image I on any (flat or curved) plane in a space using the optical path changers 16. Multiple plane images may be combined to form a three-dimensional image.

The embodiments disclosed herein should not be construed to be restrictive, but may be modified within the spirit and scope of the claimed disclosure. The technical features disclosed in different embodiments may be combined in other embodiments within the technical scope of the invention.

The invention claimed is:

1. A light guide plate device, comprising:
an incident surface configured to receive light from a light source; and
at least one optical path changer at a predetermined position on a back surface perpendicular to the incident surface, the at least one optical path changer being configured to reflect light incident through the incident surface and guided to be emitted through an emission surface parallel to the back surface, wherein
the light guide plate device causes light reflected by the at least one optical path changer to form an image in a space including the back surface,
the light guide plate device forms a formed image including a near formed image at an imaging position within a predetermined distance from the back surface and a distant formed image at an imaging position more distant than the predetermined distance from the back surface, and the near formed image includes an image formation area with a larger total area than an image formation area of the distant formed image; and
the predetermined distance is set such that the image formation area of the near formed image with the larger total area, is larger than the image formation area of the distant formed image to reduce distortion in the formed image due to a change in a viewpoint from which the formed image is viewed in a direction parallel to a light incidence direction of the light from the light source.

2. The light guide plate device according to claim 1, wherein
the predetermined distance is 25% or less of a distance from the back surface to a most distant imaging position of the distant formed image from the back surface.

3. The light guide plate device according to claim 1, wherein
the predetermined distance is 50% or less of an average of distances from the back surface to imaging positions of image formation areas of the formed image.

4. The light guide plate device according to claim 1, wherein
the predetermined distance comprises a distance between 12 mm from the back surface in a light emission direction and 24 mm from the back surface in a direction opposite to the light emission direction.

5. The light guide plate device according to claim 1, wherein
the predetermined distance is 20% or less of a minimum distance between the incident surface and the at least one optical path changer.

6. The light guide plate device according to claim 1, wherein
the predetermined distance is 20% or less of a longer one of a maximum length of a projected image area of the formed image on the back surface in a direction perpendicular to the incident surface and a maximum length of the projected image area in a direction parallel to the incident surface.

7. The light guide plate device according to claim 1, wherein
the near formed image has a higher luminous intensity than the distant formed image.

8. The light guide plate device according to claim 1, wherein
the near formed image has a higher luminance level than the distant formed image.

9. The light guide plate device according to claim 1, wherein
the near formed image includes a plane image.

10. The light guide plate device according to claim 9, wherein the plane image has an area of 30% or greater of a total area of image formation areas of the formed image.

11. The light guide plate device according to claim 1, wherein
the distant formed image is a line image.

12. The light guide plate device according to any claim 1, wherein
the formed image has an area of 50% or greater of a total area of image formation areas on the back surface.

13. The light guide plate device according to claim 1, wherein
the near formed image has a greater viewing angle than the distant formed image.

14. The light guide plate device according to claim 1, wherein
the at least one optical path changer includes an optical path changer to form the near formed image and an optical path changer to form the distant formed image, and
emission light reflected by the optical path changer to form the near formed image has a greater divergence angle than emission light reflected by the optical path changer to form the distant formed image.

15. The light guide plate device according to claim 1, wherein
the near formed image has a higher resolution than the distant formed image.

16. The light guide plate device according to claim 2, wherein
the near formed image has a higher luminous intensity than the distant formed image.

17. The light guide plate device according to claim 3, wherein
the near formed image has a higher luminous intensity than the distant formed image.

18. The light guide plate device according to claim 4, wherein
the near formed image has a higher luminous intensity than the distant formed image.

19. The light guide plate device according to claim 5, wherein
the near formed image has a higher luminous intensity than the distant formed image.

20. The light guide plate device according to claim 6, wherein
the near formed image has a higher luminous intensity than the distant formed image.

* * * * *